United States Patent [19]
Wraight et al.

[11] Patent Number: 5,408,097
[45] Date of Patent: Apr. 18, 1995

[54] METHOD AND APPARATUS FOR CORRECTING NATURAL GAMMA RAY MEASUREMENTS FOR BOREHOLE FLUID EFFECTS

[75] Inventors: Peter D. Wraight, Missouri City; Donald C. McKeon, Houston, both of Tex.

[73] Assignee: Schlumberger Technology Corporation, Houston, Tex.

[21] Appl. No.: 159,412

[22] Filed: Nov. 29, 1993

[51] Int. Cl.⁶ .............................................. G01V 5/04
[52] U.S. Cl. .................................. 250/256; 250/264; 250/265
[58] Field of Search ................ 250/256, 264, 265, 262

[56] References Cited

U.S. PATENT DOCUMENTS

| | | | |
|---|---|---|---|
| 2,686,881 | 8/1954 | Herzog et al. | 250/256 |
| 4,436,996 | 3/1984 | Arnold et al. | 250/256 |
| 4,493,998 | 1/1985 | Smith, Jr. et al. | 250/252.1 |
| 4,524,274 | 6/1985 | Scott | 250/262 X |
| 4,542,292 | 9/1985 | Ellis . | |
| 4,546,252 | 10/1985 | Dion | 250/252.1 |
| 4,585,939 | 4/1986 | Arnold et al. | 250/256 |
| 4,929,915 | 5/1990 | Wittrisch | 250/256 X |
| 5,023,449 | 6/1991 | Holenka et al. | 250/265 X |
| 5,053,620 | 10/1991 | McKeon et al. . | |
| 5,120,955 | 6/1992 | Galford . | |
| 5,171,986 | 12/1992 | Loomis et al. . | |

Primary Examiner—Constantine Hannaher
Assistant Examiner—Edward J. Glick
Attorney, Agent, or Firm—Henry N. Garrana; Darcell Walker

[57] ABSTRACT

A method and apparatus for detecting natural gamma-ray signals of an earth formation and correcting these gamma-ray signals for effects from borehole gamma-rays. Gamma-ray signals are detected at two detector locations in the borehole. The borehole effects are derived from the differences between the detected signals. After the borehole effects are determined, the detected gamma-ray signal is corrected for these effects and measurements of the formation elements are derived. A differential signal between the two detectors is created by excluding a small volume of borehole fluid from one of the detectors from the borehole fluid, before detecting gamma-rays at both detectors. The excluder displaces a known volume of borehole fluid equal to the volume of the excluder. Both detectors record gamma-ray generated from the formation and borehole. The additional volume of borehole fluid at one detector causes the detected signals to be different. This difference in signals is caused by the detection of the gamma-rays from the extra volume of fluid by the exposed detector. From this differential signal, correction parameters are derived to correct the signal for borehole effects caused by potassium in the borehole fluid, and thereby leave a signal indicative of natural gamma-rays from the earth formation.

18 Claims, 4 Drawing Sheets

FIG. 3
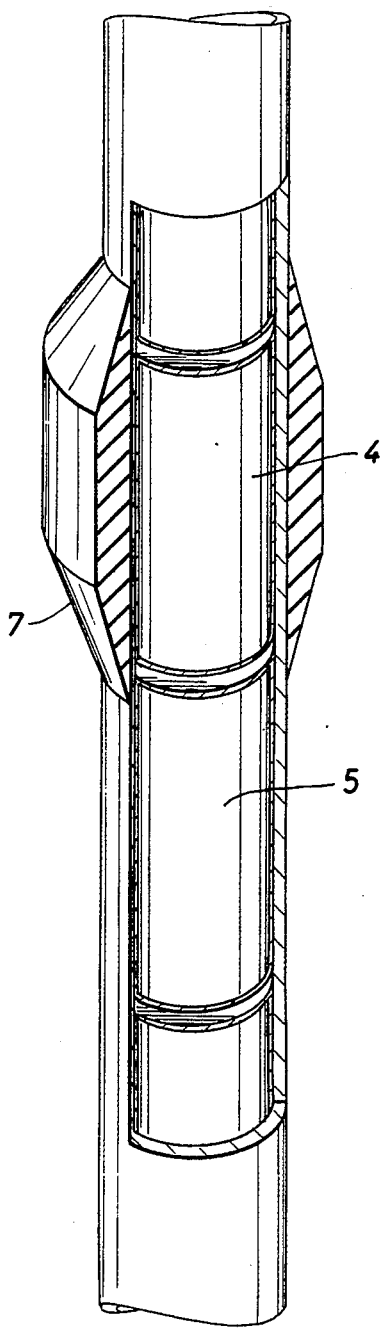
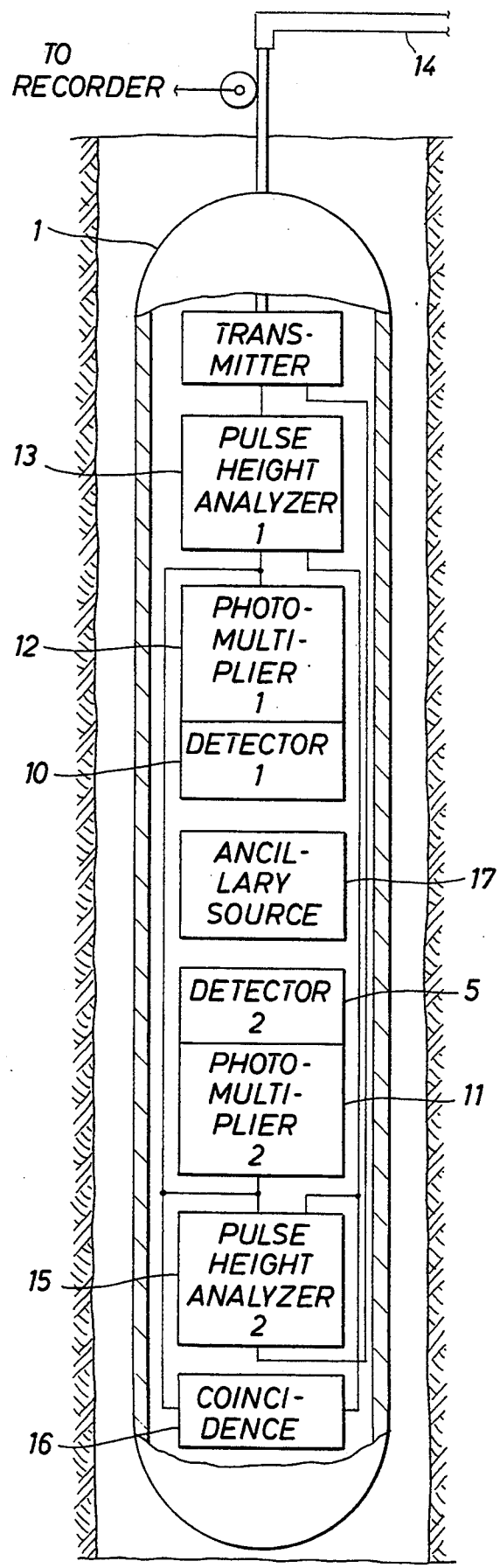
FIG. 4

METHOD AND APPARATUS FOR CORRECTING NATURAL GAMMA RAY MEASUREMENTS FOR BOREHOLE FLUID EFFECTS

FIELD OF THE INVENTION

The invention is in the field of well logging, in which measurements taken in a borehole are used in searching for and exploiting valuable underground resources such as oil and gas. It is particularly directed to a method and a system for natural gamma radiation logging, in which a log is derived of the radiation detected in selected energy windows and is converted into a log of selected subsurface materials, such as thorium, uranium and potassium. Yet more specifically, the invention is directed to deriving a log of the selected subsurface materials which is substantially corrected for errors due to factors such as radiation emitting materials (e.g. potassium, in the form of potassium chloride) in the borehole fluid.

BACKGROUND OF THE INVENTION

In natural gamma radiation logging, a tool capable of detecting gamma radiation in each respective one of several energy windows is passed through a selected borehole interval, and a record is made of the gamma rays detected within the respective windows. The gamma rays are emitted in the decay of subsurface materials such as thorium (Th), uranium (U) and potassium (K), each of which emits a characteristic spectrum resulting from the emission of one or more gamma ray at various energies. The tool output is converted to a log of the concentrations of Th, U, K at the respective borehole depth levels.

The Th, U, K log is important in searching for and exploiting underground resources because it is believed that these materials appear in nature with a discernible relationship to geology sand rock morphology. The log is particularly useful in the exploration for and exploitation of oil and gas resources because it is believed that the concentrations of Th, U, K taken individually or in combination are a good indication of previously unavailable information as to the presence, type and volume of shale or clay in the formations surrounding the borehole.

In practice, the nature of the logging process makes the detected spectra continuous, with poor energy resolution and poor counting statistics. Nevertheless, there are known techniques for usefully estimating and logging the Th, U, K concentrations.

The difficult measurement conditions in Th, U, K logging have been made even more difficult by the common use of borehole fluids (e.g. drilling mud) containing potassium chloride (KCl). These borehole fluids stabilize the borehole by reducing clay and shale hydration and provide various other benefits. However, the KCl in the borehole fluid emits its own gamma radiation which is merged with that of potassium in the undisturbed formations surrounding the borehole. Typically, the drilling and logging environment makes it impossible or impractical to measure the concentration of KCl in the mud at the time the borehole logging commences.

It is known that KCl in the mud filtrate has a significant effect in natural gamma radiation logging. See Cox, J. W. et al, "The Effect Of Potassium-Salt Muds On Gamma-Ray, and Spontaneous Potential Measurements," SPWLA 1976, and references cited therein.

Additional uncertainties are introduced by the fact that relatively few gamma rays can be detected in the respective energy windows at a given borehole depth because the tool must move through the borehole at a sufficiently high speed to allow drilling or production activities to resume as soon as possible, and by the fact that the tool response changes as a function of borehole size.

U.S. Pat. No. 4,542,292 describes a method wherein is derived a log of gamma radiation detected in selected energy windows, (e.g. five windows) for a selected borehole interval, and converting it into a log of the selected materials, (e.g. Th, U, K) which is substantially corrected for at least one of: (i) a gamma ray emitter in the borehole fluid, e.g. potassium salts and (ii) a gamma ray attenuator in the borehole fluid, e.g. a strong attenuator such as barite and/or hematite. In a particular embodiment, the concentrations of the three materials (Th, U, K) are related through an empirically derived logging tool sensitivity matrix to five corrected window measurements. The method used for deriving the potassium correction in the '292 patent relies on the assumption that the spectrum of gamma-rays from the potassium in the borehole fluid is somewhat different from that in the undisturbed formations surrounding the borehole. These differences are in fact quite small and instability of the correction can result. The invention describes here makes no use of this assumption but provides a direct way of measuring the concentration of potassium in the mud.

A major problem with many of the correction methods is the assumption of the potassium chloride (KCl) concentration. Current operations depend on information from the personnel at the well site to learn the potassium concentration of the borehole mud. Often, the correct potassium concentration is not known therefore current operations use assumed values for the potassium concentration. These assumptions have been shown to be unreliable.

U.S. Pat. No. 5,120,955 describes a method and apparatus for correcting for borehole effects in logging natural gamma ray measurements wherein, for each depth in the borehole, a spectrum is made of the gamma rays detected in each of several energy channels and expressed as $U=SY$, where "Y" is the elemental yields and "S" is a composite spectra matrix made of individual standard spectra characteristic of a given borehole environment; yields "Y" are then calculated. A borehole correction factor is determined from the general relationship between the borehole parameters, the standard spectra and the measured spectra. The yields are then corrected for borehole effects by applying the correction factor. The correction is energy independent, for energies above a given threshold and is also independent from the radioactive elements.

The methods described in this patent are primarily for correcting the effect of mud weight and borehole size on the T, U, K measurement. Consequently, there is a need for an improved and simpler method for determining potassium gamma rays generated from borehole fluids for correcting natural gamma ray logs for borehole effects resulting from the borehole potassium gamma rays.

SUMMARY OF THE INVENTION

It is an object of this invention to perform natural gamma-ray spectroscopy measurements.

It is another object of this invention to measure the potassium concentration mount in the borehole fluid. The present invention measures borehole fluid effects during natural gamma ray logging and corrects the natural gamma ray logs for these effects. These fluids are usually borehole muds. Natural gamma ray measurements contain gamma rays emitted from thorium (T), uranium (U), and potassium (K) in the formation. However, potassium can also be one of the components of the borehole mud. The borehole mud emits gamma rays from its potassium content that are also detected during the gamma ray logging process. The gamma rays from the borehole potassium can effect the potassium measurement from the formation. In the present invention, the borehole potassium concentration is determined by calculating the potassium concentration of a known volume of borehole mud. The volume of borehole mud is determined by displacing a known volume of borehole mud from around a detector means that is used to detect the natural gamma rays in the formation and determining the potassium concentration of that displaced volume of mud. From the potassium concentration of the borehole mud, the borehole effects are determined. Thereafter, the measured signal of the formation is corrected for the effects of the potassium in the borehole mud.

In the method of this invention, a natural gamma ray logging tool containing at least two detector means is suspended in a borehole. One detector means is surrounded by a borehole fluid excluder means. The excluder means displaces a known volume of borehole fluid equal to the volume of the excluder from around the detector means. During the detection of the gamma rays, the excluder surrounding one of the detector means will cause the measurements of the two detectors to be slightly different when there is potassium in the mud. The difference in the measurements of the two detector means is mainly attributed to the potassium concentration of the volume of displaced borehole fluid. The borehole fluid potassium concentration is calculated from the measured difference between signals. From this calculation, the measurement of formation gamma rays is corrected to account for the effects of the borehole potassium concentration.

BRIEF DESCRIPTION OF THE DRAWING

FIG. 3 is a view of the fluid excluder surrounding one of the detectors in the tool.

FIG. 4 is a cross-section view of the components of a preferred embodiment of the present invention.

DESCRIPTION OF THE PREFERRED EMBODIMENT

In natural gamma-ray spectroscopy logging, thorium, uranium and potassium concentrations in the rock formation are measured. However, the spectroscopy tools are also sensitive to potassium in the borehole fluids (for this description the borehole fluid will be drilling mud). Therefore, borehole muds containing potassium chloride (KCl) can have a significant effect on the potassium measurement. In order to accurately determine the formation potassium concentration, the amount of potassium in the borehole mud must be accurately determined.

Figure 1:
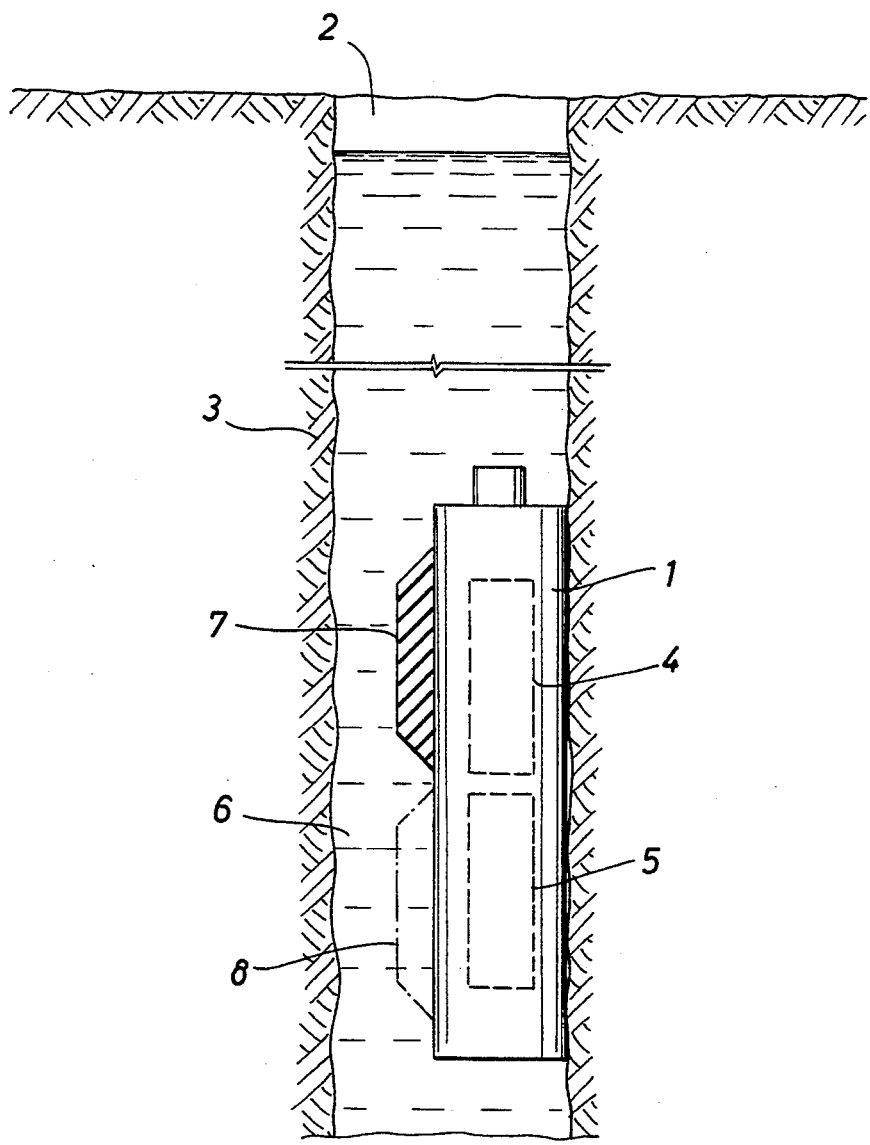
FIG. 1 is a side borehole view of a well-logging tool in an embodiment of the present invention.

Referring to FIG. 1, a logging tool 1 is placed in a borehole 2 surrounded by an earth formation 3. The tool 1 contains two detector means 4 and 5 to detect the natural gamma-rays emitted from the earth formation 3. Borehole fluid 6 (drilling mud) also occupies the borehole. As stated earlier, the borehole fluid can also emit gamma-rays that can be detected by the logging tool. In order to correct any measurements of these borehole fluid effects, an excluder device 7 is placed around one of the detectors. As shown, this excluder 7 displaces a volume of borehole fluid 8 equal to the volume of the excluder.

Figure 2:
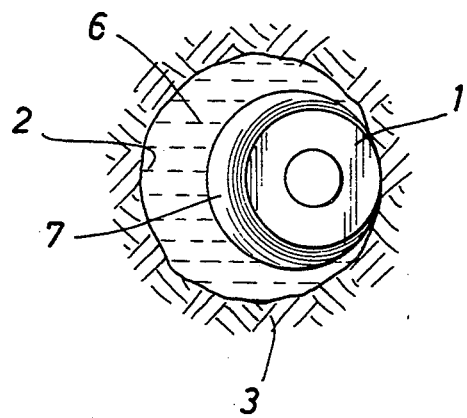
FIG. 2 is a view from atop the borehole of the tool, fluid excluder and borehole fluid.

FIG. 2 gives a top view of the tool suspended in a borehole. As shown, the tool 1 is placed adjacent the borehole wall 2. The excluder 7, surrounds one of the detectors, thereby excluding a fixed volume of mud from the vicinity of detector 4.

In FIG. 3, the fluid excluder 7 displaces borehole fluid from around one of the detectors (in FIG. 3 it is detector 4), so that the difference between the two detector measurements is a measure of the radioactivity of the displaced borehole fluid 8. The thin stainless steel structure sleeve passes over both detectors so that the difference between the two detectors is only due to the displaced mud. However, the stainless steel sleeve does attenuate the formation signal slightly.

FIG. 4 shows a preferred embodiment of a gamma-ray logging tool of which the excluder device of the present invention can be applied. A similar tool is described in U.S. Pat. No. 5,120,955. Within this tool 1, two scintillation crystal detectors are provided 4 and 5. Associated with a first detector 4 is a photomultiplier 10 which outputs data to a pulse height analyzer 12 linked to a transmitter 13 allowing transmission of data through cable 14. The tool also comprises a second detector 5 associated to a second photomultiplier 11 feeding a second pulse height analyzer 15 linked to transmitter 13. The outputs of the respective photomultipliers 10 and 11 are connected to a coincidence circuit 16. Between the detectors 4 and 5 can be an ancillary nuclear source 17, e.g. a 22 Na source. As stated, the detectors 4 and 5 are scintillation crystal detectors, and more particularly include BGO crystal ( e.g. of the formula $Bi_4Ge_3O_{12}$). By way of non-limiting example, the BGO detectors 4 and 5 are of cylindrical shape of approximately 5 to 10 inches (12.5 to 26 centimeters) length in the longitudinal direction, and of 1 to 4 inches (2.5 to 10 centimeters) diameter (in the transverse direction). Other scintillation detector types such as gadolinium orthosilicate (GSO) and sodium iodide (NaI Tl) may also be used. The BGO detectors and associated electronics are located inside a Dewer flask (not shown, but is described in U.S. Pat. No. 5,171,986 issued to Loomis, assigned to the assignee of the present application and incorporated herein by reference). This flask shields the detectors and permits the operation of the BGO detectors at downhole temperatures of 500° F. (260° C.). Other detector types such as GSO and NaTI can operate at high temperatures without the Dewer flask. More details about the general arrangement of the tool 1 can be found in U.S. Pat. No. 5,023,449, and U.S. Pat. No. 5,120,955, and incorporated herein by reference.

Figure 5:
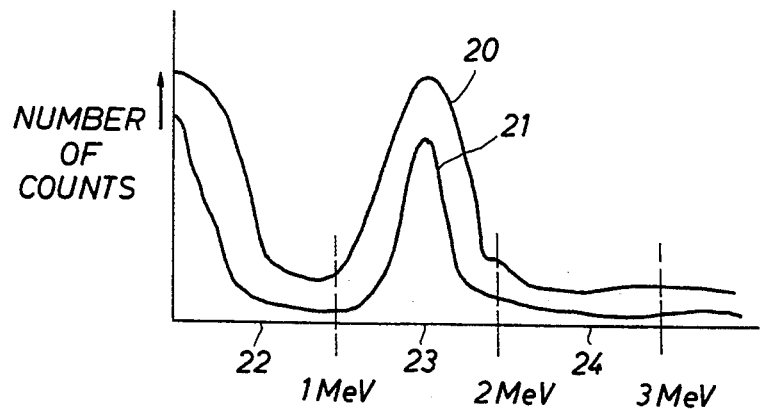
FIG. 5 is a plot of the measured spectra of the formation from two detectors.

In the operation of the invention, gamma-ray signal counts are detected for formation and borehole gamma-rays. The gamma-rays are detected in various energy windows or channels according to the energy level of each gamma-ray. A count is made of the number of gamma-rays in each energy window. From these counts a measured gamma-ray spectrum is generated for each detector. FIG. 5 shows a spectrum generated from each detector. From this plot the differences in the detector signals can be observed.

Figure 6:
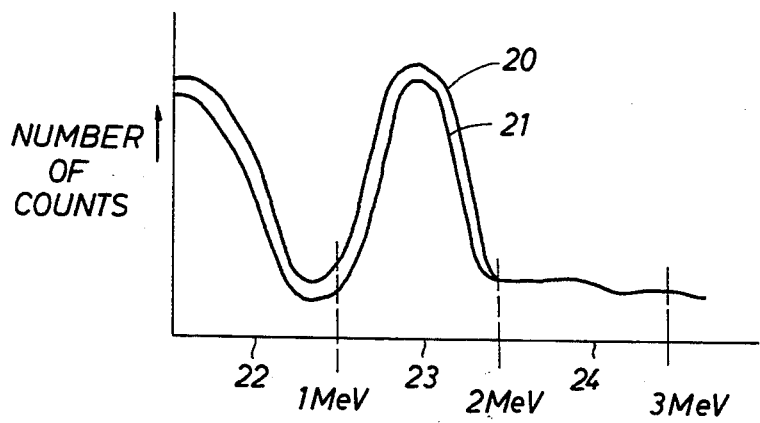
FIG. 6 is a plot of the normalized spectra.
Figure 7:
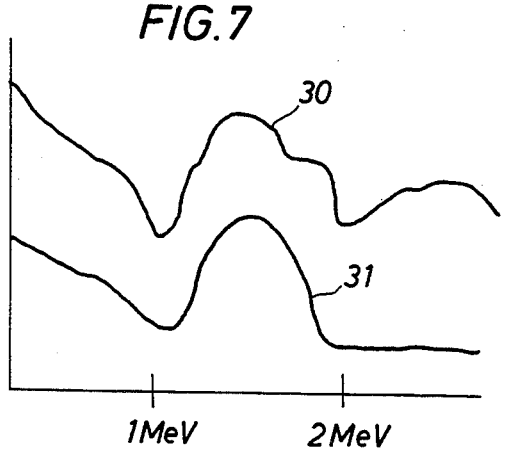
FIG. 7 is a plot of the total measured spectrum and the borehole spectrum.
Figure 8:
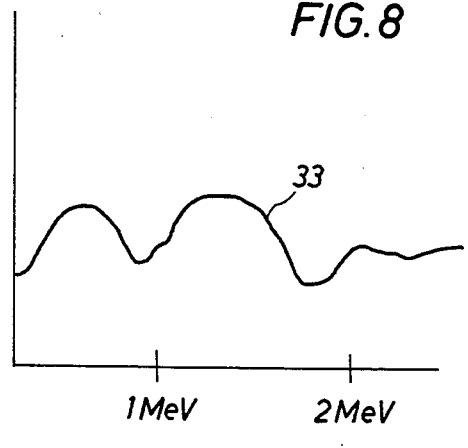
FIG. 8 is a plot of the net measured spectrum.

As shown, window 22 has an energy range up to 1 Mev. Window 23 which has an energy range of 1 Mev to 2 Mev will contain gamma-rays from thorium, uranium and potassium. The potassium gamma-rays may come from the borehole mud or the formation. Window 24 which has an energy range of 2 Mev to 3 Mev will only contain gamma-rays from thorium and uranium since the maximum effective potassium gamma-ray energy is approximately 1.9 Mev. Therefore, any difference between the two spectra in the energy range of window 24 must be caused by slight differences in the two detector sensitivities or from the fact that the excluder sleeve density is different from the mud density. In order to ensure that the difference between the two spectra in the window 23 energy range is only related to the potassium concentration in the borehole mud, the two spectra need to be normalized in the higher energy range of window 24. As stated earlier, because of the energy range of this window (approximately 2 Mev to 3 Mev), this window does not have counts from the potassium which are substantially in the range of 1 Mev to 2 Mev. Therefore, the signal can be normalized from this window without affecting any differences in the measurements caused by potassium effects. The normalization forces the two measured spectra to be equal by adjusting one spectra until it matches the other measured spectrum. This normalization of the signals using window 24 is shown in FIG. 6. The signals in window 24 are now aligned to account for any detector sensitivity differences. However, there is still a difference in the signals 20 and 21 in window 23. This difference suggest that the effects in the measured spectrum were also due to radioactivity in the borehole. The concentration of potassium in the borehole mud is calculated using this count and a standard laboratory formation. Using the calculated concentration of potassium in the borehole mud, the known borehole size and borehole mud weight, a borehole spectrum is generated that shows the counts attributed to the borehole gamma-rays as illustrated in FIG. 7. These borehole counts from spectrum 31 are subtracted from the total counts of the measured spectrum 30 to get a net count rate and a net measured spectrum 33 shown in FIG. 8. The previously described steps of establishing a gamma ray count in each window of each detector; normalizing the gamma ray counts; calculating the difference between gamma ray counts after normalization; and determining the potassium concentration can also be repeated a plurality of times and avenged to obtain a measured concentration potassium.

In the implementation of this method, the pair of detectors will have a total response due to formation and borehole components (the borehole signal is assumed to be only due to borehole potassium) of:

$$C_{lwr} = b_{det} + TH_{form} + U_{form} + K_{form} + K_{bh} + \Delta K_{bh} \quad (1)$$

$$C_{upr} = b_{det} + Th_{form} + U_{form} + K_{form} + K_{bh} \quad (2)$$

where $C_{lwr}$ is the lower detector 5 count rate, $C_{upr}$ is surrounded by the excluder device 7 and is the upper detector 4 count rate, $b_{det}$ is the detector background signal, $Th_{form}$ is the formation thorium signal, $U_{form}$ is the formation uranium signal, $K_{form}$ is the potassium signal, $K_{bh}$ is the borehole potassium signal exclusive of the displacement zone, and $\Delta K_{bh}$ is the borehole potassium signal from the displacement zone. In addition, although the borehole potassium signal is expected to vary with hole size and mud weight, it will be directly proportional to the potassium concentration in number of atoms per cc. in the borehole fluid.

Figure 9:
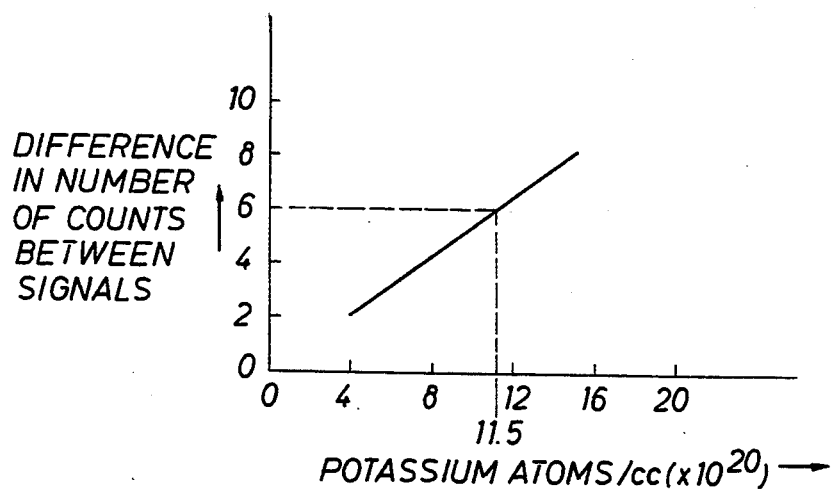
FIG. 9 is a graph of the differential signal gamma-ray count versus the concentration of potassium (in number of atoms/cc) in the borehole fluid.

In an example, detector 5 has a gamma-ray count of 200 cps in window 23 and 51 cps in window 24. The excluder detector 4 has a gamma-ray count of 190 cps in window 23 and 50 cps in window 24. To normalize the signal of window 24 of detector 4 to equal the count of window 24 of detector 5, detector 4 is multiplied by normalization factor 51/50. This result gives new detector 4 counts of 194 cps for window 23 and 51 cps for window 24. Windows 24 in both detectors match as shown in FIG. 6. Therefore, the signals are corrected for detector sensitivities and the only difference is the counts of window 23 which are the result of borehole potassium. The resulting difference of 6 cps corresponds to a known concentration of potassium in the borehole mud. The conversion of these gamma-ray counts to concentration of potassium in the borehole fluid is determined from laboratory experiments and is plotted as shown in FIG. 9. For a count rate of 6 cps, the potassium concentration is approximately $11.5 \times 10^{20}$ atoms/cc (e.g. 100K ppm solution of potassium chloride KCL has a concentration of $8.6 \times 10^{20}$ atoms/cc).

Figure 10:
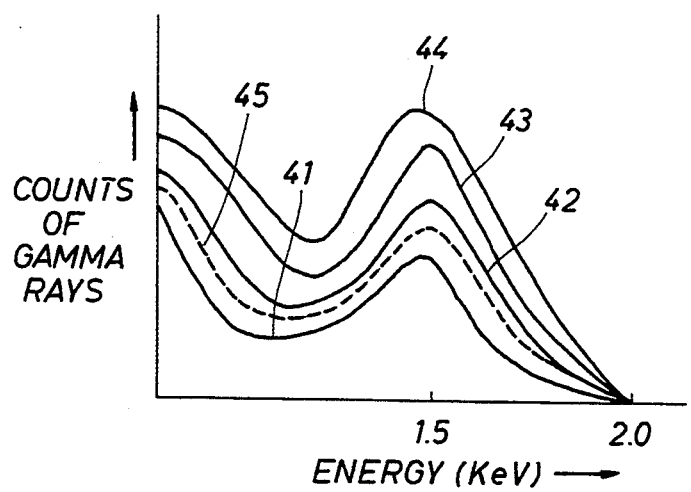
FIG. 10 is a plot of the borehole spectrum for various borehole sizes.

The effect of the borehole size on the borehole potassium signal must be taken into consideration when subtracting that signal from the measured detector signal. FIG. 10 shows various borehole spectra 41, 42, 43 and 44 for different borehole sizes 6 inches, 8 inches, 10 inches and 12 inches (15, 20 and 25 centimeters) respectively at a potassium concentration of the borehole of $1 \times 10^{20}$ atoms/cc. As shown, the spectra all merge at approximately 2.0 Mev and all spectra have a photopeak at 1.5 Mev. From the borehole size, which is measured or already has been measured, the exact spectrum may be interpolated from the appropriate curves. As shown 45 is the interpolated curve for a borehole having a seven inch (18 centimeter) diameter. This spectrum 45 is multiplied by the potassium concentration from FIG. 9 to account for the actual measured potassium concentration of the borehole fluid. In this example, the multiplying constant would be 11.5 (as shown in FIG. 9) since the measured potassium concentration was found to be $11.5 \times 10^{20}$ atoms/cc, and the spectra shown in FIG. 10 are for $1 \times 10^{20}$ atoms/cc of potassium concentration.

Figure 11:
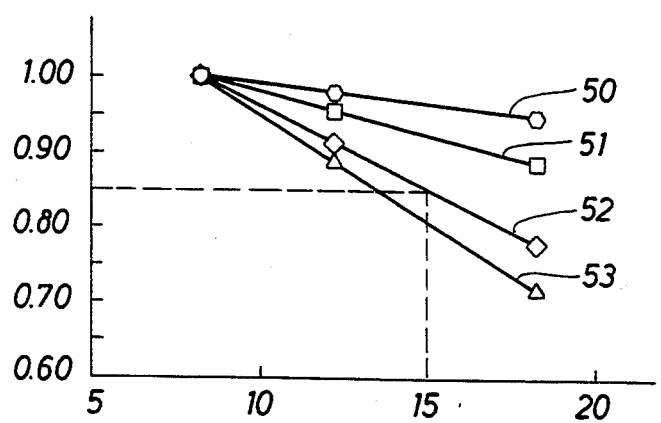
FIG. 11 is a plot of the mud weight constants.

The borehole potassium signal is also a function of borehole fluid density (mud weight). As this mud weight increases, the borehole potassium signal decreases slightly. In this invention, the resultant multiplied spectrum, discussed above, is again multiplied by a mud weight constant to account for effects of mud weight on the spectrum. FIG. 11 plots relationships 50, 51, 52 and 53 between mud weights and the multiplier constant for borehole sizes from approximately 6, 8, 12 to 16 inches (15, 20, 30.5 and 40.5 centimeters) respectively. For a mud weight of 15 lbs/gallon (1.8 gm/c) in a 12 inch borehole the corresponding constant is 0.85. The spectrum is multiplied by this constant to get a resultant spectrum. This resultant spectrum 31 is then subtracted from the measured spectrum 30 to get a spectrum 33 corrected for borehole effects.

The fluid excluder itself also decreases the TUK signal from the formation by about 8%. The decrease is due primarily to the 3/32"-inch wall stainless steel sleeve that supports the rubber excluder.

To achieve better statistical precision, it is anticipated that data will have to be acquired for several minutes before making a borehole potassium correction.

The method and apparatus of this invention provides significant advantages over the prior art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of the invention which is limited only by the following claims.

We claim:

1. A method of for measuring natural gamma-rays corrected for boreholes fluid effects comprising:
    a) displacing the borehole fluid around one of a pair of detectors, thereby excluding the one detector from the borehole fluid and creating a volume of displaced borehole fluid;
    b) detecting gamma-rays at two detector locations in the borehole, the gamma-rays emitted by the naturally radioactive element(s) of the formation and borehole;
    c) establishing a measured spectrum of the total gamma-rays detects;
    d) generating a borehole spectrum from the gamma-rays detected from the borehole fluid;
    e) subtracting the boreholes spectrum from the measured spectrum to obtain a net spectrum that is corrected for borehole effects; and
    f) fitting the corrected net spectrum to determine the formation element concentrations.

2. The method of claim 1 wherein said borehole fluid is excluded by placing an excluder device around the one detector prior to placing the pair of detectors in the borehole.

3. The method of claim 1 wherein there is a difference in the gamma-rays detected by each detector of said detector pair, said difference being at least in part caused by the displaced volume of borehole fluid.

4. The method of claim 1 wherein the borehole spectrum is generated from the disposed volume of borehole fluid.

5. The method of claim 4 wherein the borehole spectrum is generated from the borehole size, the borehole fluid density and the concentration of potassium in the fluid.

6. The method of claim 5 wherein the concentration of potassium in the fluid is determined by:
    a) establishing a count of gamma-rays for each detector for each of a plurality of energy windows;
    b) normalizing the count of gamma rays of one of the two detector counts;
    c) calculating the difference between the two gamma-ray counts after normalization; and
    d) determining the concentration of potassium from the difference.

7. The method of claim 6 wherein the step of normalizing comprises the steps of:
    a) comparing the two gamma-ray counts in a selected energy window to determine a normalization factor; and
    b) adjusting one of the detector counts until the two detector counts in said selected energy window are equal by multiplying said one detector count by the normalization factor.

8. The method of claim 6 wherein the step of normalizing comprises the steps of:
    a) multiplying the counts in each energy window of a first detector signal by the ratio of counts in one energy window of a second detector signal to the counts in said same energy window of said first detector signal to derive a new count of said first detector signal; and
    b) subtracting the counts of said second detector signal from the new count of said first detector signal, in an energy window of which counts are primarily due to gamma rays resulting from potassium, to achieve a true difference between said two detector counts, said difference attributable to borehole effects.

9. The method of claim 6 wherein the steps (a) through (d) are repeated a plurality of times and the concentration of potassium in the borehole mud is the average of the plurality of measured concentrations.

10. The method of claim 6 wherein the step of normalizing comprises the steps of:
    a) multiplying the counts in each energy window of a second detector signal by the ratio of counts in one energy window of a first detector signal to the counts in said same energy window of said second detector signal to derive a new count of said second detector signal; and
    b) subtracting the counts of said first detector signal from the new count of said second detector signal, in an energy window of which counts are primarily due to gamma rays resulting from potassium, to achieve a true difference between said two detector counts, said difference attributable to borehole effects.

11. A method for determining the potassium concentration of borehole fluid during natural gamma-ray logging comprising the steps of:
    a) displacing a known volume of borehole fluid from around a detector means;
    b) determining the signal of the borehole fluid from the displaced volume of borehole fluid; and
    c) calculating an equivalent borehole potassium concentration from the borehole fluid signal.

12. The method of claim 11 further comprising after step (c) the step of determining a plurality of potassium concentrations over a period of time while maintaining a continuing sum of the total potassium concentration of said time period.

13. A method of claim 11 wherein the signal of the borehole fluid is determined by:
   a) determining a count of gamma-rays for each of at least two detectors for each of a plurality of energy windows, one said detector being surrounded by an excluder device;
   b) normalizing the count of gamma-rays between of one of the two detector counts;
   c) calculating the difference between the two gamma-ray counts after normalization; and
   d) determining the concentration of potassium from the difference.

14. The method of claim 13 wherein the step of normalizing comprises the steps of:
   determining a normalization factor by comparing the gamma-ray counts of the two detectors in a selected energy window to determine the difference between said two detector counts in said selected energy window; and
   adjusting one of the detector counts until the two detector counts in said selected energy window are equal by multiplying said one detector count by the normalization factor.

15. An apparatus for determining the presence of naturally radioactive elements in an earth formation surrounding a borehole comprising:
   a) a first and second detector means for detecting and for counting gamma rays emitted by naturally radioactive elements;
   b) an excluder device surrounding one of said detector means for shielding said detector means for borehole fluids thereby having a shielded and an unshielded detector means, said excluder comprising an asymmetrical shape rubber sleeve molded on a housing and shielding said one detector means, said housing containing said first and second detector means;
   c) a means for establishing a spectrum of counts verses energy of said gamma rays detected in a plurality of energy windows for each of said detector means;
   d) a means for generating a borehole spectrum of gamma rays detected from borehole fluids, said borehole derived from the relationship between potassium concentration of the borehole fluid, the fluid weight and the borehole size; and
   e) a means for calculating naturally radioactive element(s) measurements corrected for borehole effects from the borehole spectrum.

16. The apparatus of claim 15 wherein the excluder device displaces a volume of borehole fluid equal to the volume of the excluder device, said displaced fluid emitting gamma rays that are detected by the unshielded detector means and thereby creating a differential between the counts detected by said first and second detector means.

17. The method of claim 15 wherein the density of the excluder device matches the density of the borehole fluid.

18. The apparatus of claim 15 further comprising a means for deriving the concentration of potassium in the borehole fluid comprising:
   a) a means for normalizing the detector counts of one of said first and second detector means;
   b) a means for calculating the difference between the two detector counts after normalization, said difference being attributed to borehole effects; and
   c) a means for determining the concentration of potassium in the borehole fluid from the calculated difference.

* * * * *